United States Patent [19]

Nagata et al.

[11] Patent Number: 5,732,983
[45] Date of Patent: Mar. 31, 1998

[54] THERMAL EXPANSION-ABSORBING STRUCTURE FOR PIPE ARRANGEMENT

[75] Inventors: Takashi Nagata; Takuya Yamashita, both of Oarai-machi, Japan

[73] Assignee: Doryokuro Kakunenryo Kaihatsu Jigyodan, Tokyo, Japan

[21] Appl. No.: 360,097

[22] Filed: Dec. 20, 1994

[30] Foreign Application Priority Data

Dec. 20, 1993 [JP] Japan ................ 5-320094

[51] Int. Cl.$^6$ .......................................... F16L 51/04
[52] U.S. Cl. .............................. 285/187; 285/179
[58] Field of Search ..................... 285/187, 179; 176/50

[56] References Cited

U.S. PATENT DOCUMENTS

| | | | |
|---|---|---|---|
| 3,625,018 | 10/1969 | Roberts | 285/187 |
| 3,818,935 | 6/1974 | Karker et al. | 285/187 |
| 3,945,431 | 3/1976 | Straub | 285/187 |
| 4,056,438 | 11/1977 | Gama et al. | 176/50 |
| 4,315,644 | 2/1982 | Jansing | 285/187 |

FOREIGN PATENT DOCUMENTS 718547  11/1914  United Kingdom ............ 285/187

Primary Examiner—Eric K. Nicholson
Attorney, Agent, or Firm—Armstrong, Westerman, Hattori, McLeland & Naughton

[57] ABSTRACT

A thermal expansion-absorbing structure for piping, which is attached to a pipe end, is provided. A semicircular form of torus shell is joined to a cylindrical form of short double pipe to define together a U-shaped longitudinal section, which is deformed due to the expansion or contraction displacement of the pipe, thereby absorbing thermal expansion. This achieves a piping reduction, compactness of a reactor building and a reduction in the construction cost of a fast reactor plant, and ensures great safety.

5 Claims, 2 Drawing Sheets

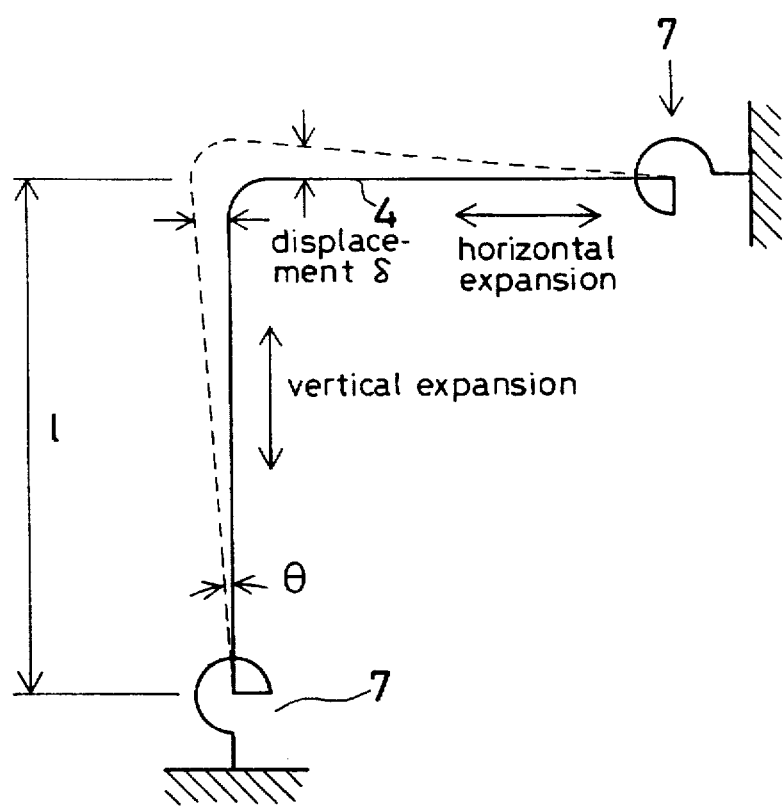

THERMAL EXPANSION-ABSORBING STRUCTURE FOR PIPE ARRANGEMENT

BACKGROUND OF THE INVENTION

The present invention relates to a thermal expansion-absorbing structure for pipe arrangement which is applicable to fast reactor piping, general chemical plant piping and other pipe arrangements needed to absorb displacements.

Usually, pipe arrangements exposed to high temperature undergo some displacement due to thermal expansion. Especially in the case of a fast reactor with many pipes built in it, several elbows are incorporated in the piping route so as to make use of their own flexibility to absorb displacements due to thermal expansion due to a temperature change in operation.

To absorb displacements due to thermal expansion by use of the elbow's own flexibility, however, it is required to provide a three-dimensionally complicated pipe arrangement. This does not only give rise to an increase in the overall length of piping, but also needs a wide-enough space in a reactor building so as to incorporate therein a lengthy pipe arrangement. For a fast reactor, it is not only required to absorb displacements due to thermal expansion, but safety must be ensured as well.

An object of the present invention is to solve the problems mentioned above by the provision of a thermal expansion-absorbing structure for piping, which achieves a reduction in piping length and hence in reactor building size, so that the construction cost of a fast reactor plant can be considerably cut down while great safety is maintained.

SUMMARY OF THE INVENTION

According to the present invention, this and other objects are achieved by the provision of a thermal expansion-absorbing structure for piping, which is attached to a pipe end, characterized in that a semicircular form of torus shell is joined to a cylindrical form of short double pipe to define together a U-shaped longitudinal section, which is deformed in association with the expansion or contraction displacement of the pipe, thereby absorbing thermal expansion.

Preferably, the piping is fast reactor piping.

When the pipe arrangement is displaced due to thermal expansion, the double pipe is rotated and displaced so that their center lines are inclined for absorption of thermal expansion displacement. The thermal expansion-absorbing structure of the present invention achieves absorption of thermal expansion with a simple design, and makes a great contribution to achieving safety.

Still other objects and features of the invention will in part be obvious and will in part be apparent from the specification.

The present invention accordingly comprises the features of construction, combinations of elements, and arrangement of parts which will be exemplified in the construction hereinafter set forth with reference to the accompanying drawings, and the scope of the present invention will be indicated in the claims.

BRIEF DESCRIPTION OF THE DRAWINGS

FIG. 3 is a schematic of the displacement-absorbing mechanism of the thermal expansion-absorbing structure.

Figure 1A:
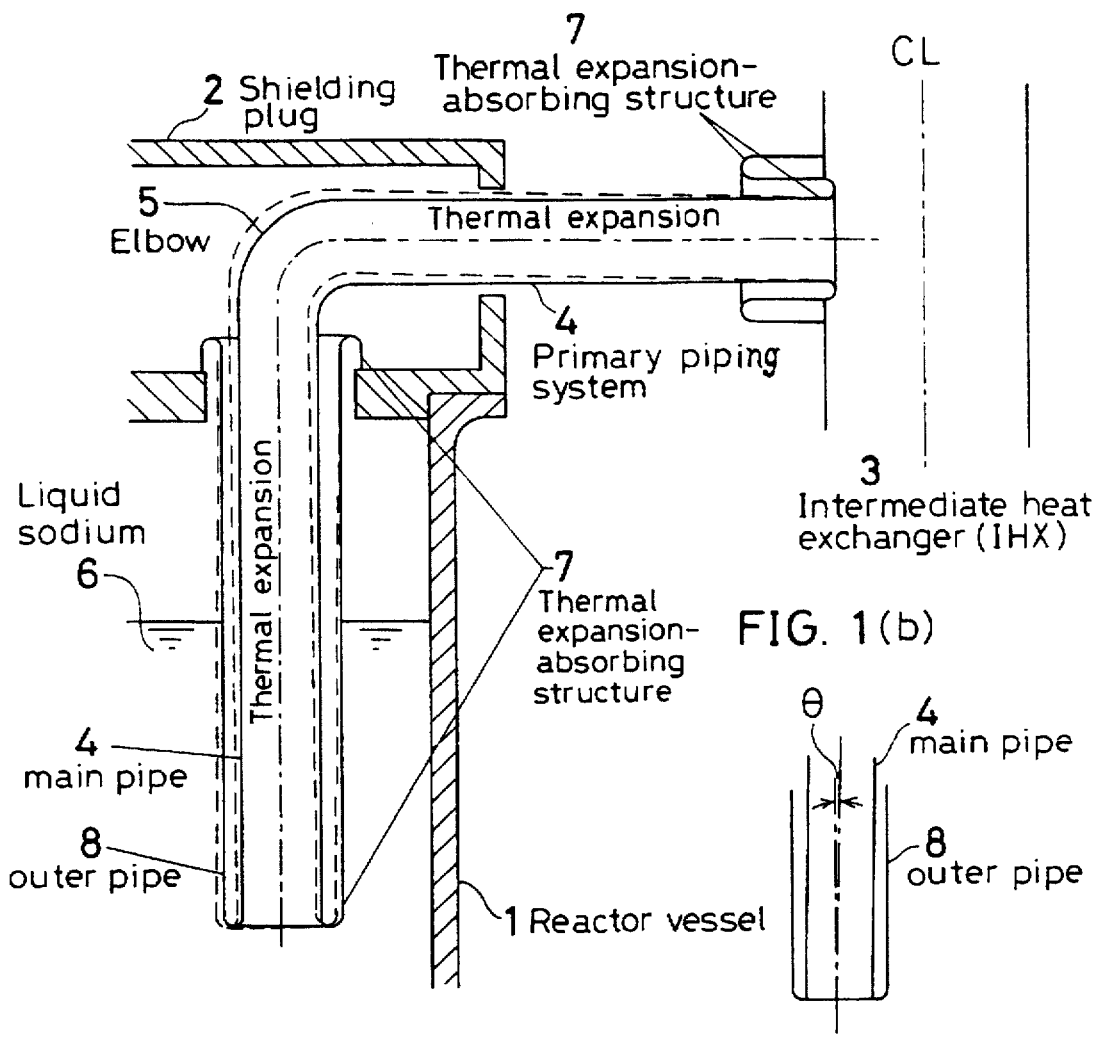
FIGS. 1a and 1b are a schematic of one embodiment of the thermal expansion-absorbing structure according to the present invention, which is shown to be applied to a primary high-temperature piping system extending from a reactor vessel to an intermediate heat exchanger.

Throughout the drawings, reference numeral 1 represents a reactor vessel, 2 a shielding plug, 3 an intermediate heat exchanger, 4 a primary piping system, 5 an elbow, 6 liquid sodium, 7 the thermal expansion-absorbing structure, and 8 an outer pipe member.

EXPLANATION OF THE PREFERRED EMBODIMENTS OF THE INVENTION

The primary piping system 4 is a high-temperature pipe that extends from within the liquid sodium in the reactor vessel 1, passes through the shielding plug 2, is bent by the elbow 5 through a right angle, and terminates at and in the intermediate heat exchanger 3. As illustrated, the thermal expansion-absorbing structure 7 is attached to the lower end of the pipe in the reactor vessel 1, the shielding plug 2 and an inlet nozzle portion in the intermediate heat exchanger 3.

Figure 1B:
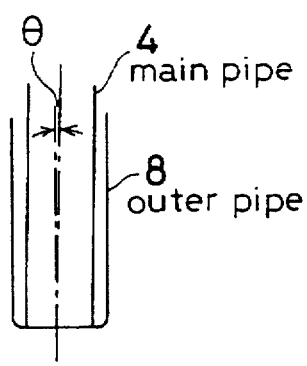
Figure 2:
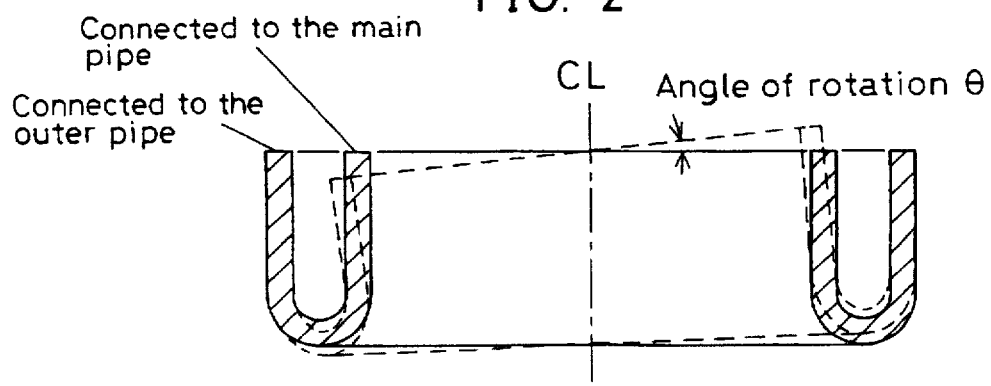
FIG. 2 is a schematic of the configuration in the longitudinal section of the thermal expansion-absorbing structure.

As can be seen from the longitudinally sectioned schematic of FIG. 2, the thermal expansion-absorbing structure 7 is built up of a cylindrical form of short double pipe jointed at its distal end to a semicircular form of torus shell to define together a U-shaped longitudinal section. The upper ends of the double pipe is connected to the main and outer pipes 4 and 8, respectively. The main pipe expands horizontally and vertically due to thermal expansion in association with an increase in operating temperature, as shown by a broken line in FIG. 1(a). When no thermal expansion-absorbing structure is used with a relatively simple pipe arrangement such as one shown in FIG. 1, excessive force is applied on the elbow 5 due to the thermal expansion displacement of the main pipe, resulting in an elbow collapse.

Now assume the primary pipe displaces horizontally and vertically due to thermal expansion, as shown by a broken line in FIG. 1(a). Then, as can be seen from FIG. 1(b), the thermal expansion-absorbing structure is so deformed that the center line of the main pipe 4 is displaced, and makes a small inclination represented by an angle θ, with respect to that of the outer pipe 8. More exactly, as shown by a broken line in FIG. 2, the inner pipe of the double pipe is rotated through the angle θ and remains inclined at that angle with respect to the outer pipe, so that the displacement due to thermal expansion can be absorbed.

This displacement-absorbing mechanism is schematically shown in FIG. 3. As illustrated, the thermal expansion-absorbing mechanisms 7 are attached to both ends of a pipe having horizontal and vertical pipe sections. Now let 1, δ and θ represent the length of the vertical (or horizontal) pipe section, the displacement occurring due to thermal expansion, and the angle of rotation of the thermal expansion-absorbing structures. Then, the displacement that can be absorbed becomes:

$$\delta = l \times \theta$$

Thus, even at a slight angle θ of rotation the displacement δ that can be absorbed becomes large.

The thermal expansion-absorbing structure according to the present invention is simple in design; it is excellent in productivity and the ability to be inspected, and is very improved in terms of safety because of the absence of any discontinuous portion making stress concentration unlikely to occur, and so is best-suited for use with fast reactor piping.

The present thermal expansion-absorbing structure, when it is applied to a pipe arrangement exposed to high temperature, enables the overall length of piping to be considerably reduced, as compared with a conventional pipe arrangement relying upon an elbow alone. Especially when it is applied to fast reactor piping, great safety is achieved with some considerable reduction in the construction cost of a primary plant including a reactor building.

While the present invention has been described as being applied to fast reactor piping, it is understood that the thermal expansion-absorbing structure of the present invention is applicable to general chemical plant piping or other pipe arrangements needed to absorb displacements.

What is claimed is:

1. A piping system comprising a plurality of thermal expansion-absorbing structure for piping, wherein said plurality of thermal expansion-absorbing structure includes: p1 a first end portion having a substantially semicircular cross-sectional form of torus shell which is joined to a cylindrical form of a short double-walled pipe to define together a substantially U-shaped longitudinal section, an intermediate portion which is connected to said short double-walled pipe, wherein said intermediate portion is formed of a main pipe and an outer pipe, said main pipe extending to form a bent or elbow portion, a second end portion having a substantially semicircular cross-sectional form of torus shell which is joined to at least one of said intermediate portion and an external structure, and a third end portion having a substantially semicircular cross-sectional form of torus shell which is joined to at least one of said bent or elbow portion and another external structure.

2. The piping system as claimed in claim 1, wherein said first end portion is deformed due to an expansion or a contraction displacement of said double-walled pipe, wherein said second end portion is deformed due to an expansion or a contraction displacement of at least one of said intermediate portion and said external structure, and wherein said third end portion is deformed due to an expansion or a contraction displacement of at least one of said bent or elbow portion and said another external structure.

3. The piping system as claimed in claim 1, wherein said piping is a fast reactor piping.

4. The piping system as claimed in claim 2, wherein said external structure is a reactor vessel.

5. The piping system as claimed in claim 2, wherein said another external structure is an intermediate heat exchanger.

* * * * *